United States Patent
Gysling et al.

(10) Patent No.: US 10,571,361 B2
(45) Date of Patent: Feb. 25, 2020

(54) INDUCING AND MONITORING A VIBRATORY RESPONSE IN A COMPONENT

(71) Applicant: United Technologies Corporation, Farmington, CT (US)

(72) Inventors: Daniel Gysling, South Glastonbury, CT (US); Joseph V. Paturzo, Avon, CT (US); Richard A. Lomenzo, Enfield, CT (US); Allison Nicklous, Old Saybrook, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/790,892

(22) Filed: Oct. 23, 2017

(65) Prior Publication Data

US 2019/0120717 A1 Apr. 25, 2019

(51) Int. Cl.
*G01M 7/02* (2006.01)
*G01M 15/14* (2006.01)

(52) U.S. Cl.
CPC ............ *G01M 7/022* (2013.01); *G01M 15/14* (2013.01)

(58) Field of Classification Search
CPC ...... G01M 7/022; G01M 7/025; G01M 7/027; G01M 7/06; G01M 7/08; G01M 7/00; G01M 13/00; G01M 15/00; G01M 15/14
USPC ... 73/662, 660, 664, 668, 576, 578, 862.333
See application file for complete search history.

(56) References Cited

U.S. PATENT DOCUMENTS

| | | | |
|---|---|---|---|
| 3,374,662 A * | 3/1968 | Achter | G01N 3/32 73/571 |
| 3,495,447 A * | 2/1970 | Conniff | G01M 7/00 73/770 |
| 3,536,940 A * | 10/1970 | Colletti | G01M 7/00 310/17 |
| 4,073,600 A | 2/1978 | Doman | |
| 4,445,381 A * | 5/1984 | Russenberger | G01N 3/38 73/666 |
| 4,475,385 A | 10/1984 | Farmer | |
| 5,206,816 A | 4/1993 | Hill et al. | |
| 5,239,864 A | 8/1993 | von Pragenau | |

(Continued)

FOREIGN PATENT DOCUMENTS

GB 946589 1/1964

OTHER PUBLICATIONS

EP search report for EP18201860.6 dated Aug. 14, 2019.
Partial European Search Report dated Mar. 19, 2019 for Application No. 18201860.6.

*Primary Examiner* — Suman K Nath
(74) *Attorney, Agent, or Firm* — O'Shea Getz P.C.

(57) ABSTRACT

A system is provided for testing a component. This system includes a support structure, an excitation system and a sensor system. The support structure is configured to support the component. The excitation system includes a plurality of permanent magnets and a plurality of electromagnets. The permanent magnets are arranged in an array and configured for rigid connection to the component. Each of the electromagnets is associated with a respective one of the permanent magnets. The excitation system is configured to respectively control interaction of the electromagnets with the permanent magnets to excite a vibratory response in the component. The sensor system is configured to output data indicative of the vibratory response.

19 Claims, 5 Drawing Sheets

(56) References Cited

U.S. PATENT DOCUMENTS

| | | |
|---|---|---|
| 6,195,982 B1 | 3/2001 | Gysling et al. |
| 6,339,878 B1 | 1/2002 | Owen et al. |
| 6,377,900 B1 | 4/2002 | Ueno |
| 6,582,183 B2 | 6/2003 | Eveker et al. |
| 6,584,849 B2 | 7/2003 | Loftus et al. |
| 7,383,136 B1 | 6/2008 | Griffin et al. |
| 7,509,862 B2 | 3/2009 | Cohen et al. |
| 8,313,280 B2 | 11/2012 | Hurwitz et al. |
| 8,600,707 B1 | 12/2013 | El-Aini et al. |
| 8,646,251 B2 | 2/2014 | Rosenkrans et al. |
| 2009/0261665 A1* | 10/2009 | Wang .................... H02K 33/16 310/24 |
| 2010/0167620 A1* | 7/2010 | Jackson ................ A63H 33/26 446/135 |
| 2011/0233871 A1 | 9/2011 | Davis |
| 2012/0102701 A1 | 5/2012 | Borufka et al. |
| 2014/0331789 A1* | 11/2014 | Shimoyama ........ B60B 27/0068 73/862.338 |
| 2018/0149162 A1 | 5/2018 | Nicklous et al. |

\* cited by examiner

INDUCING AND MONITORING A VIBRATORY RESPONSE IN A COMPONENT

BACKGROUND OF THE DISCLOSURE

1. Technical Field

This disclosure relates generally to systems and methods for testing a component and, more particularly, to inducing and monitoring a vibratory response in a component of, for example, a gas turbine engine.

2. Background Information

Various systems and methods are known in the art for testing and monitoring dynamic responses in a component of, for example, a gas turbine engine. While these known systems and methods have various advantages, there is still room in the art for improvement. For example, there is a need in the art for systems and methods for inducing and monitoring a vibratory response in a component such as, for example, a gas turbine engine seal element.

SUMMARY OF THE DISCLOSURE

According to an aspect of the present disclosure, a system is provided for testing a component. This system includes a support structure configured to support the component. The system also includes an excitation system and a sensor system. The excitation system includes a plurality of permanent magnets and a plurality of electromagnets. The permanent magnets are arranged in an array and configured for rigid connection to the component. Each of the electromagnets is associated with a respective one of the permanent magnets. The excitation system is configured to respectively control interaction of the electromagnets with the permanent magnets to excite a vibratory response in the component. The sensor system is configured to output data indicative of the vibratory response.

According to another aspect of the present disclosure, a method is provided for testing a component. During this method, the component is arranged with an excitation system that includes a plurality of permanent magnets and a plurality of electromagnets. Each of the electromagnets is configured to interact with a respective one of the permanent magnets. The permanent magnets are rigidly connected to the component after the arranging. A vibratory response in the component is excited by operating the excitation system to respectively control interaction of the electromagnets with the permanent magnets. Data indicative of the vibratory response is output from a sensor system.

The method may also include a step of processing the data with a computer system to determine at least one of a structural characteristic or a dynamic response characteristic of the component.

The operating of the excitation system to control the interaction of the electromagnets with the permanent magnets may include varying strength, frequency and phase of a first magnetic field generated by a first of the electromagnets according to a function.

The operating of the excitation system to control the interaction of the electromagnets with the permanent magnets further may include varying strength, frequency and phase of a second magnetic field generated by a second of the electromagnets according to the function. The varying of the strength, the frequency and the phase of the first magnetic field may be out of phase with the varying of the strength, the frequency and the phase of the second magnetic field.

The method may also include a step of rotating a rotor about an axis, wherein the rotor and the component form a lift off seal system.

The component may be configured as or otherwise include a component of a gas turbine engine.

The support structure may be configured as or otherwise include a mount for rigidly attaching the component to the support structure.

The system may include a stationary base structure. The support structure may be attached to the stationary base structure through a compliant connection.

The electromagnets may be connected to the stationary base structure.

Each of the permanent magnets may be attached to the support structure and thereby configured for rigid connection to the component through the support structure.

The excitation system may be configured to change a parameter of a magnetic field generated by one of the electromagnets according to a function.

The parameter may be strength of the magnetic field

The parameter may be phase of the magnetic field.

The parameter may be frequency of the magnetic field.

The function may be a sinusoidal function.

The excitation system may be configured to vary strength, frequency and phase of a first magnetic field generated by a first of the electromagnets according to a function. The excitation system may be further configured to vary strength, frequency and phase of a second magnetic field generated by a second of the electromagnets according to the function. The varying of the strength, the frequency and the phase of the first magnetic field may be out of phase with the varying of the strength, the frequency and the phase of the second magnetic field.

The excitation system may be further configured to vary strength, frequency and phase of a third magnetic field generated by a third of the electromagnets according to the function. The varying of the strength, the frequency and the phase of the first magnetic field may be in phase with the varying of the strength, the frequency and the phase of the third magnetic field.

The excitation system may be further configured to vary strength, frequency and phase of a third magnetic field generated by a third of the electromagnets according to the function. The varying of the strength, the frequency and the phase of the third magnetic field may be out of phase with the varying of the strength, the frequency and the phase of the first magnetic field and the varying of the strength, the frequency and the phase of second magnetic field.

The system may include a rotor and a motor configured to drive rotation of the rotor about an axis. The rotor may be configured for forming a lift off seal system with the component.

The sensor system may include a plurality of accelerometers arranged in an array and configured for rigid connection to the component. The accelerometers may be configured to sense the vibratory response of the component.

The foregoing features and the operation of the disclosure will become more apparent in light of the following description and the accompanying drawings.

DETAILED DESCRIPTION

The present disclosure includes systems and methods for testing at least one component. An example of such a component is a stationary seal land (e.g., a carbon seal) for a lift off seal system of a gas turbine engine such as, but not limited to, a turbofan gas turbine engine or a turbojet gas turbine engine. The present disclosure, however, is not limited to testing such an exemplary component. For example, the component may alternatively be another stationary component or structure of the gas turbine engine; e.g., a vane airfoil, a vane array, a case, etc. In another example, the component may be configured as a movable component or structure of the gas turbine engine (e.g., a rotor blade, a rotor disk, a shaft, etc.) where that component is tested, for example, when stationary in a laboratory setting. Of course, the systems and methods of the present disclosure may also test component(s) for other types of rotational equipment as well as component(s) for non-rotational equipment components. For ease of description, however, the component being monitored may be described below as the stationary seal land.

Figure 1:
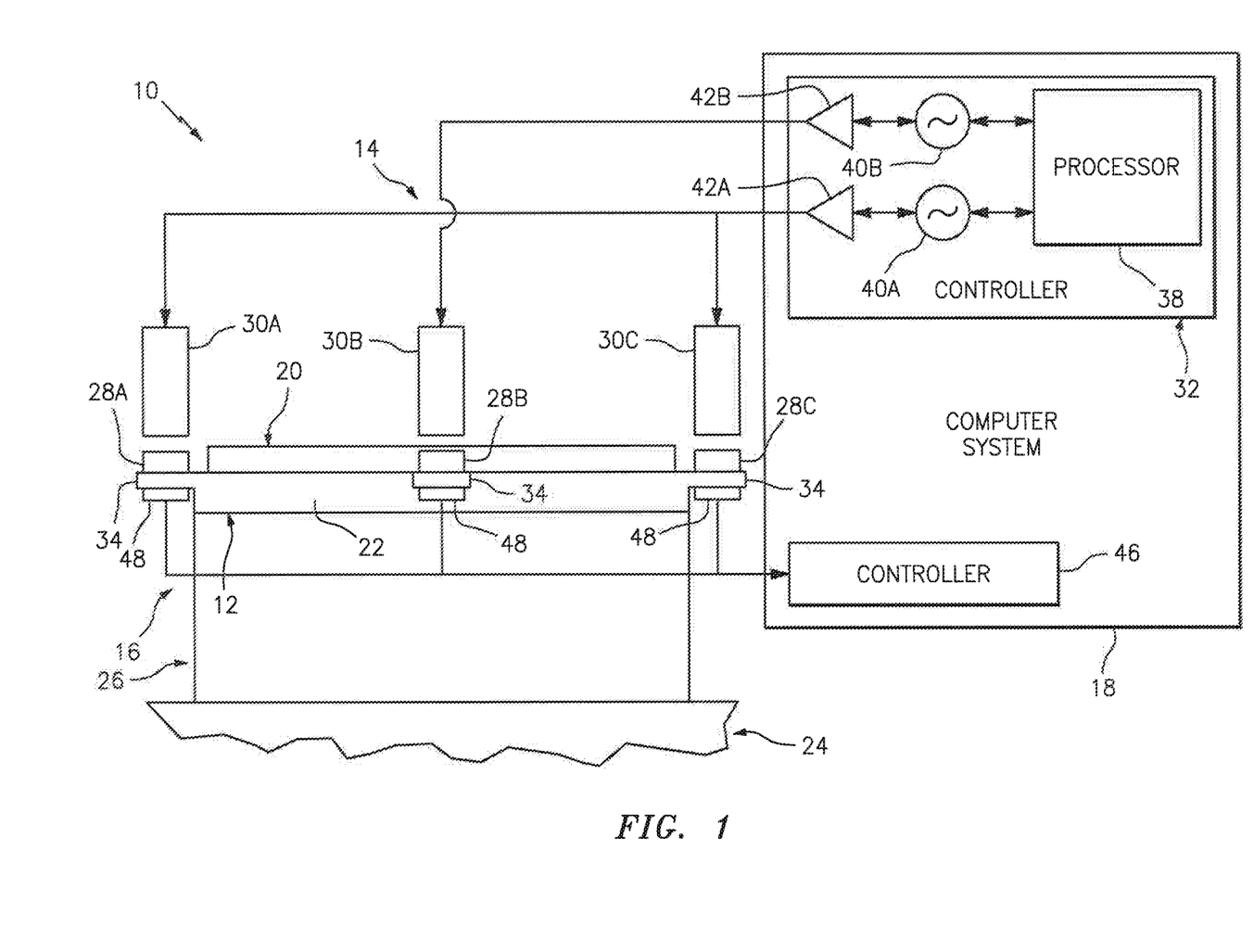
FIG. 1 is a schematic illustration of a system for testing a component such as, for example, a seal element.

FIG. 1 is a schematic illustration of an exemplary system 10 for testing the component 20. This testing system 10 includes a support structure 12, a vibration excitation system 14, a sensor system 16 and a computer system 18.

The support structure 12 is configured to support the component 20 during the testing thereof. The support structure 12 of FIG. 1, for example, is configured to receive the component 20 and rigidly hold the component 20 therewith. The term "rigid" may be used herein to describe an (e.g., direct or indirect) engagement between two components where those two components (A) do not move relative to one another and (B) are operable to transfer vibrations and/or other loads therebetween with substantially no transmission loss; e.g., less than 0.5 to 3 percentage transmission loss. The support structure 12, for example, may include one or more mounts (e.g., clamps, fasteners, etc.) that fixedly (e.g., immovably) attach the component 20 to a base 22 of the support structure 12. In another example, the component 20 may also or alternatively be adhered (e.g., epoxied, glued), brazed, welded or otherwise bonded to the support structure 12.

The support structure 12 of FIG. 1 is connected to a stationary base structure 24 of the testing system 10. This connection between the support structure 12 and the stationary base structure 24 may be a flexible/compliant connection. The support structure 12 of FIG. 1, for example, may be attached to the stationary base structure 24 through a spring system 26 (or springs). This spring system 26 is mounted between the support structure 12 and the stationary base structure 24. The spring system 26 and, more generally, the compliant connection enable the support structure 12 and the component 20 rigidly attached thereto to move (e.g., vibrate) during the testing as described below in further detail. The present disclosure, however, is not limited to the foregoing exemplary compliant connection.

Figure 2:
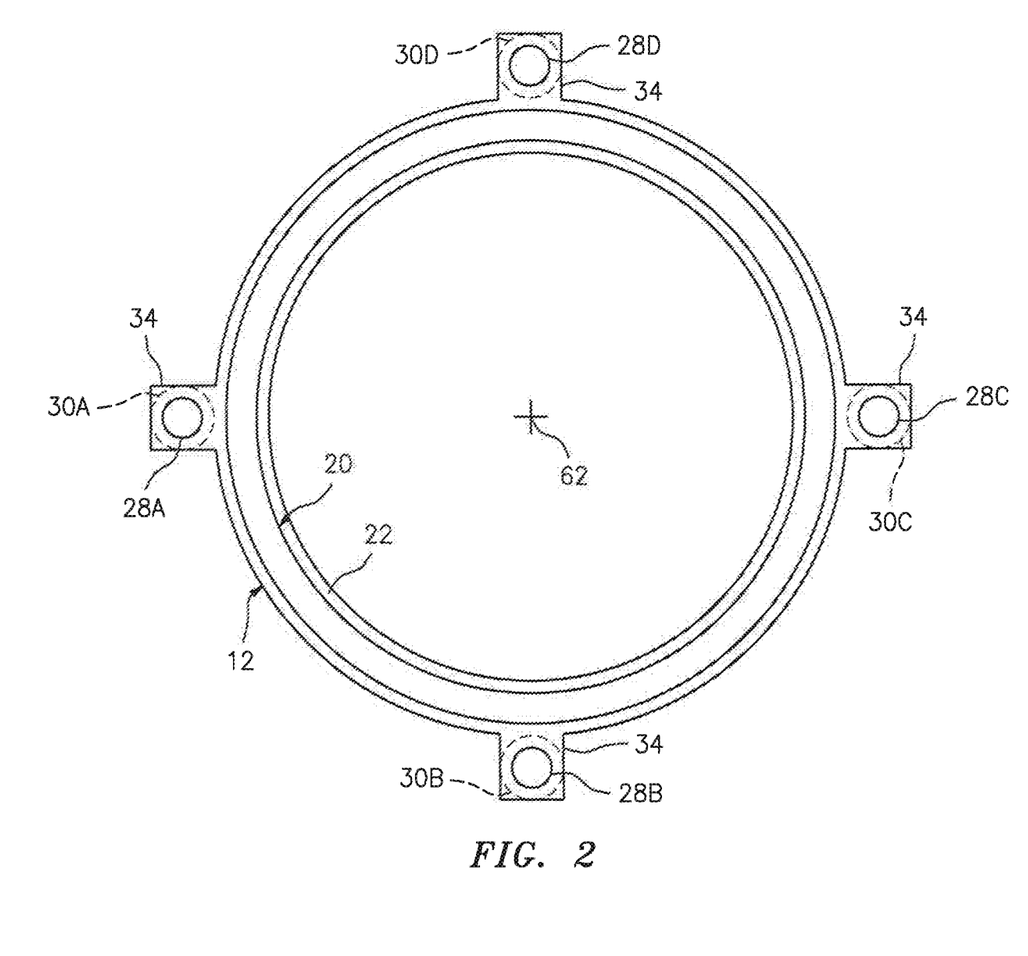
FIG. 2 is a diagrammatic illustration of a portion of the testing system of FIG. 1, where out of view electromagnets are shown by dashed lines.

Referring to FIGS. 1 and 2, the excitation system 14 includes a plurality of permanent magnets 28A-D (generally referred to as "28"), a plurality of electromagnets 30A-D (generally referred to as "30") and a controller 32. The permanent magnets 28 are arranged in an (e.g., annular) array. For example, the permanent magnets 28 are respectively arranged at discrete locations circumferentially about the base 22 of the support structure 12. The permanent magnets 28 are configured for rigid connection to the component 20. Each of the permanent magnets 28, for example, is fixedly attached (e.g., bonded) to a respective tab 34 of the support structure 12, which tab 34 projects (e.g., radially) out from an outer periphery of the base 22. In the specific embodiment of FIGS. 1 and 2, the permanent magnets 28 are disposed on the same side of the support structure 12 as the component 20; however, the present disclosure is not limited to such an exemplary arrangement.

The electromagnets 30 are also respectively arranged at discrete locations circumferentially about the base 22 of the support structure 12. These electromagnets 30 may be fixedly and rigidly connected to the stationary base structure 24 via a plurality of mounts 36; e.g., see FIG. 3. Each of the electromagnets 30 is associated with a respective one of the permanent magnets 28. This association enables each of the electromagnets 30 to be magnetically engaged with a respective one of the permanent magnets 28 during the testing of the component 20. Each of the electromagnets 30, for example, may be located proximate (e.g., adjacent but not touching) a respective one of the permanent magnets 28. Each of the electromagnets 30 of FIG. 1 is also substantially aligned (e.g., coaxial) with a respective one of the permanent magnets 28.

Figure 4:
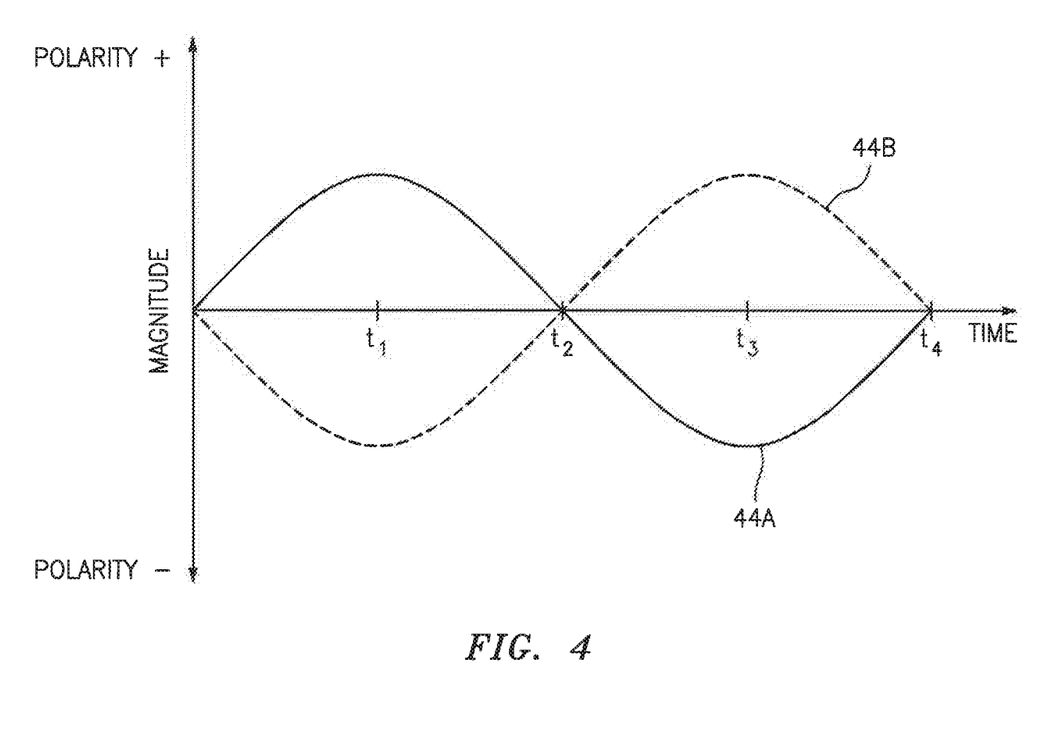
FIG. 4 is a graph illustrating signal magnitude versus time for first and second control signals.

The controller 32 is configured in signal communication with each of the electromagnets 30. The controller 32 of FIG. 1 includes a processor 38, one or more signal generators 40A and 40B (e.g., oscillator(s)) and one or more signal amplifiers 42A and 42B; of course, in other embodiments, the signal amplifiers 42A and 42B may be configured discrete from the controller 32. The processor 38 is configured to cause each signal generator 40A, 40B to generate a control signal 44A, 44B (see FIG. 4) according to a function such as, but not limited to, a sinusoidal function. The first control signal 44A generated by the first signal generator 40A may be out of phase (e.g., completely opposite or otherwise phase shifted from) the second control signal 44B generated by the second signal generator 40B as shown, for example, in FIG. 4. The first control signal 44A is amplified by the first amplifier 42A, and then directed to a subset of one or more the electromagnets 30; e.g., the diametrically opposed electromagnets 30A and 30C of FIG. 2. Similarly, the second control signal 44B is amplified by the second amplifier 42B, and then directed to another subset of one or more of the electromagnets 30; e.g., the diametrically opposed electromagnets 30B and 30D of FIG. 2.

The control signals 44A and 44B are received by the electromagnets 30 and cause the electromagnets 30 to respectively generate magnetic fields with changing/varying strengths and/or frequency and/or phases. Briefly, for oscillatory excitation, changing the phase of the electromagnetic field generated by the electromagnets by one-hundred and eight degrees may be considered herein to be equivalent to changing a polarity of the electromagnetic. The varying magnetic fields respectively interact with magnetic fields produced by the permanent magnets 28, which interaction may excite a vibratory response in the component 20 as described below in further detail. The excitation system 14 is thereby configured to control interaction between the electromagnets 30 and the permanent magnets 28 to excite the vibratory response in the component 20.

Referring to FIG. 1, the sensor system 16 is configured to generate and output data indicative of the vibratory response in the component 20. The sensor system 16 of FIG. 1, for example, includes a controller 46 and one or more sensors 48 such as, but not limited to, accelerometers. These sensors 48 are arranged in an (e.g., annular) array. For example, the sensors 48 are respectively arranged at discrete locations circumferentially about the base 22 of the support structure 12. The sensors 48 are configured for rigid connection to the component 20. Each of the sensors 48, for example, is fixedly attached (e.g., bonded) to a respective tab 34 of the support structure 12, on an opposite side of the tab 34 from a respective permanent magnet 28.

The controller 46 is in signal communication with each of the sensors 48. The controller 46 receives output signals from each of the sensors 48 and converts data from those output signals into output data, which output data is indicative of the vibratory response of the component 20.

The computer system 18 may be configured to include or otherwise implement (via hardware and/or software) part or all of the excitation system controller 32 and part or all of the sensor system controller 46 as shown in FIG. 1. However, in other embodiments, the computer system 18 may be a standalone system from the excitation system controller 32 and/or the sensor system controller 46. The computer system 18 is configured to process the data output from the sensor system 16 to determine one or more structural characteristics of the component 20 and/or one or more dynamic characteristics of the component 20. Using known algorithms, for example, the computer system 18 may process the output data to determine the natural frequency of the component 20, the component's damping characteristics and/or the component's modes of vibration. In addition or alternatively the computer system 18 may process the output data to determine frequency, damping and/or mode shape of the vibrations. The computer system 18 may also or alternatively process the output data to compare the sensed (actual) vibratory response of the component 20 to a predicted vibratory response of the component 20 and provide comparison data indicative thereof.

In addition to the foregoing, the computer system 18 may also be configured to monitor rotation of a rotating assembly 50 of the testing system 10; e.g., sense, display and/or record rotational speed of one or more components of the rotating assembly 50. The rotating assembly 50 of FIG. 3 includes a shaft 52 and a rotor 54 (e.g., a lift off seal element) connected to the shaft 52. The shaft 52 is mechanically coupled to a motor 56, which is in signal communication with the computer system 18. The motor 56 is configured to drive rotation of the rotor 54 through the shaft 52. The rotor 54 may be configured to sealingly engage the component 20 such that these components 20 and 54 form, for example, a lift off seal system.

Figure 5:
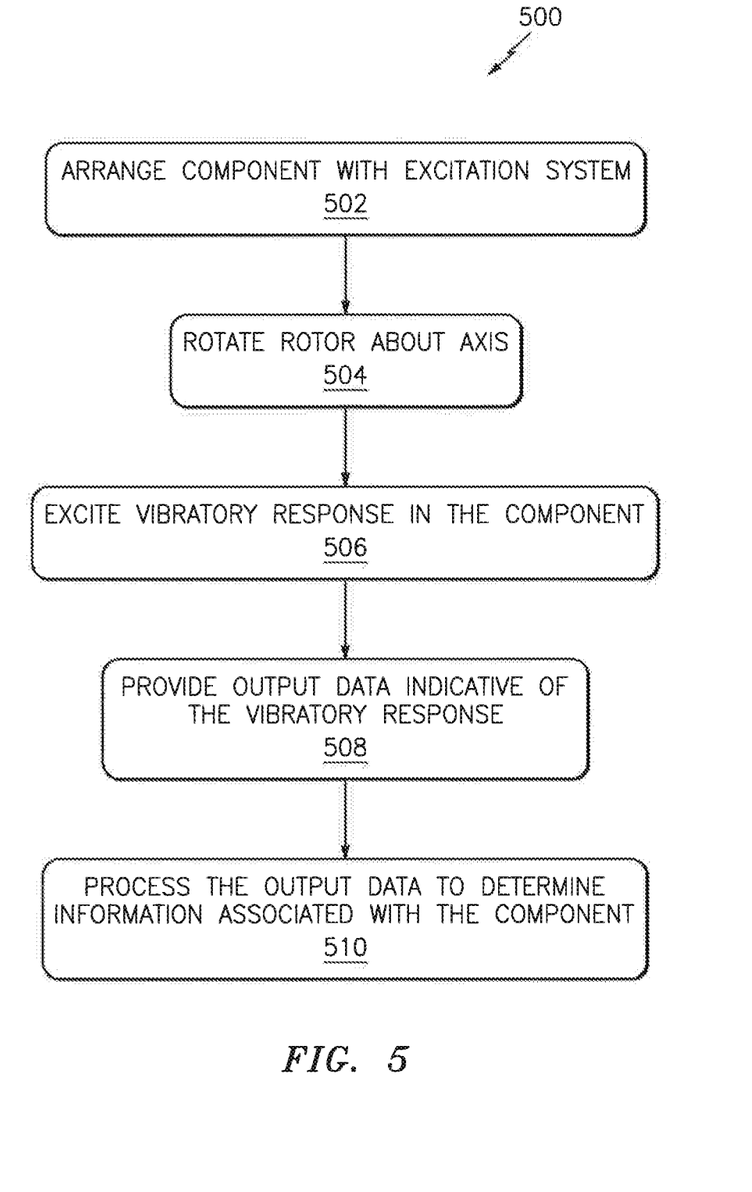
FIG. 5 is a flow diagram of a method for testing a component such as, for example, a seal element.

FIG. 5 is a flow diagram of a method 500 for testing/monitoring a component such as, but not limited to, the component 20 described above. This method 500 may be implemented using a testing system such as, but not limited to, the testing system 10 described above.

Figure 3:
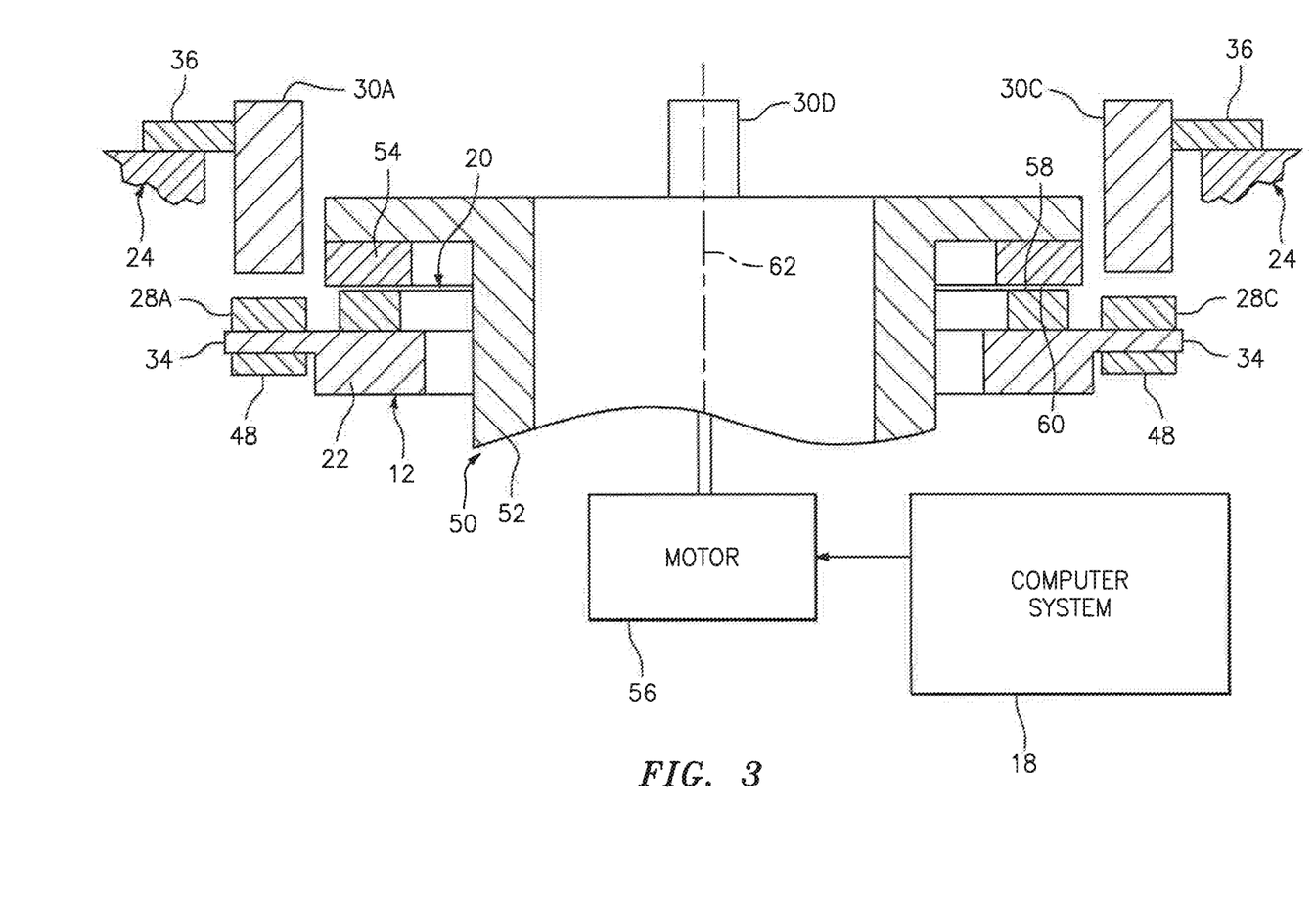
FIG. 3 is a sectional schematic illustration of a portion of the testing system of FIG. 1 further configured with a rotating assembly driven by a motor.

In step 502, the component 20 is arranged with the excitation system 14. The component 20 of FIG. 1, for example, is rigidly secured to the base 22 of the support structure 12. In this position, the permanent magnets 28 are disposed circumferentially about an outer periphery of the component 20. The permanent magnets 28 are also disposed on a common (same) side of the support structure 12 as the component 20; however, the method 500 is not limited to such an exemplary arrangement of elements. Once the component 20 is positioned, a seal surface 58 of the component 20 (e.g., a stationary seal land) is pressed against (or biased towards and in close proximity to) an axially adjacent face surface 60 of the rotor 54 as shown in FIG. 3. Thus, when the component 20 is positioned, the elements 20 and 54 may form a lift off seal system, or another type of seal system depending on the specific configurations of the elements 20 and 54.

In step 504, the rotor 54 is rotated about its axis 62. The rotational speed of the rotor 54 may be substantially constant during an entire test sequence. Alternatively, the rotational speed may be varied between various levels or varied substantially continuously; e.g., varied to simulate engine operation (rotor speed) during flight. While the rotor 54 is rotating about the axis 62, a film of fluid (e.g., a gas such as air, or a liquid such as oil) may be established between the seal system elements 20 and 54 and their surfaces 58 and 60 such that this fluid film functions as a (e.g., wear) buffer between the elements 20 and 54 as well as a seal between the elements 20 and 54.

In step 506, a vibratory response is excited in the component 20. In particular, the excitation system 14 is operated to control a magnetic interaction between each electromagnet 30 and each respective permanent magnet 28. For example, the controller 32 may provide the first control signal 44A to the electromagnets 30A and 30C and the second control signal 44B to the electromagnets 30B and 30D, where there is a phase shift between the first and the second control signals 44A and 44B as shown, for example, in FIG. 4. The strength and the phase of each control signal 44A, 44B may be varied according to a function such as, but not limited to, a sinusoidal function. With such varying control signals 44A and 44B, at time $t_1$, the electromagnets 30A and 30C may have a first (e.g., positive) phase and be respectively attracted to the permanent magnets 28A and 28C. By contrast, at time $t_3$, the electromagnets 30A and 30C may have a second (e.g., negative) phase and be respectively repulsed from the permanent magnets 28A and 28C. Similarly, at time $t_1$, the electromagnets 30B and 30D may have the second phase and be respectively repulsed from the permanent magnets 28B and 28D. By contrast, at time $t_3$, the electromagnets 3013 and 301) may have the first phase and be respectively attracted to the permanent magnets 28B and 28D. This oscillating attraction/repulsion between the magnets 28 and 30 may cause the component 20 to move back and forth locally and thereby excite the vibratory response in the component 20.

In step 508, the sensor system 16 provides output data indicative of the vibratory response in the component 20. The sensors 48 (e.g., accelerometers), for example, may measure local acceleration of the component 20 and respectively provide sensor signals to the controller 46 indicative of the measured local accelerations. The controller 46 combines data from the sensor signals to generate the output data.

In step 510, the computer system 18 processes the output data to determine information about the component 20. For example, the computer system 18 may process the output data to determine one or more structural characteristics of the component 20 and/or one or more dynamic characteristics of the component 20. Using known algorithms, for example, the computer system 18 may process the output data to determine the natural frequency of the component 20, the component's damping characteristics and/or the component's modes of vibration. The computer system 18 may also or alternatively process the output data to compare the sensed (actual) vibratory response of the component 20 to a predicted vibratory response of the component 20 and provide comparison data indicative thereof.

In the system and method embodiments described above, one set of the electromagnets 30 is phase shifted from the other set electromagnets 30. However, in other embodiments, none of the electromagnets 30 may be phase shifted; i.e., all of the electromagnets 30 may have the same phase. In still other embodiments, another set (or sets) of the electromagnets 30 may be phase shifted from each other set of the electromagnets 30; note, each set may include one or more electromagnets 30. For example, each electromagnet 30 may be operated with a unique signal phase.

In some embodiments, the electromagnets 30 and/or the sensors 48 are rigidly connected to the component 20 through the support structure 12 as described above. However, in other embodiments, one or more of the electromagnets 30 and/or one or more of the sensors 48 may be rigidly attached directly to the component 20.

While the control signals are described above as varying according to a function such as a sinusoidal function, the present disclosure is not limited to such an exemplary function. For example, in other embodiments, the function may be a square wave function or any other type of suitable function. Furthermore, while each control signal is described above as being varied according to the same function, in other embodiments a first control signal may be varied according to a first function and a second control signal may be varied according to a second function, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for testing a component, comprising:
    a support structure configured to support the component;
    a stationary base structure, wherein the support structure is attached to the stationary base structure through a compliant connection;
    an excitation system including
    a plurality of permanent magnets arranged in an array and configured for rigid connection to the component, and
    a plurality of electromagnets comprising a first electromagnet, a second electromagnet and a third electromagnet, each of the electromagnets associated with a respective one of the permanent magnets,
    the excitation system configured to respectively control interaction of the electromagnets with the permanent magnets to excite a vibratory response in the component; and
    a sensor system configured to output data indicative of the vibratory response.

2. The system of claim 1, wherein the support structure comprises a mount for rigidly attaching the component to the support structure.

3. The system of claim 1, wherein the electromagnets are connected to the stationary base structure.

4. The system of claim 1, wherein each of the permanent magnets is attached to the support structure and thereby configured for rigid connection to the component through the support structure.

5. The system of claim 1, wherein the excitation system is configured to change a parameter of a magnetic field generated by one of the electromagnets according to a function.

6. The system of claim 5, wherein the parameter comprises strength of the magnetic field.

7. The system of claim 5, wherein the parameter comprises phase of the magnetic field.

8. The system of claim 5, wherein the parameter comprises frequency of oscillations in the magnetic field.

9. The system of claim 5, wherein the function is a sinusoidal function.

10. The system of claim 1, wherein
    the excitation system is configured to vary strength, frequency of oscillations and phase of a first magnetic field generated by the first electromagnet according to a function;
    the excitation system is further configured to vary strength, frequency of oscillations and phase of a second magnetic field generated by the second electromagnet according to the function; and
    the varying of the strength, the frequency of oscillations and the phase of the first magnetic field is out of phase with the varying of the strength, the frequency of oscillations and the phase of the second magnetic field.

11. The system of claim 10, wherein
    the excitation system is further configured to vary strength, frequency of oscillations and phase of a third magnetic field generated by the third electromagnet according to the function; and
    the varying of the strength, the frequency of oscillations and the phase of the first magnetic field is in phase with the varying of the strength, the frequency of oscillations and the phase of the third magnetic field.

12. The system of claim 10, wherein
    the excitation system is further configured to vary strength, frequency of oscillations and phase of a third magnetic field generated by the third electromagnet according to the function; and
    the varying of the strength, the frequency of oscillations and the phase of the third magnetic field is out of phase with the varying of the strength, the frequency of oscillations and the phase of the first magnetic field and the varying of the strength, the frequency of oscillations and the phase of second magnetic field.

13. The system of claim 1, further comprising a rotor and a motor configured to drive rotation of the rotor about an axis, wherein the rotor is configured for forming a lift off seal system with the component.

14. The system of claim 1, wherein the sensor system comprises a plurality of accelerometers arranged in an array and configured for rigid connection to the component, and the accelerometers are configured to sense the vibratory response of the component.

15. A method for testing a component, comprising:
    supporting the component with a supporting structure where the supporting structure is attached to a stationary base structure through a compliant connection;
    arranging the component with an excitation system where the excitation system includes a plurality of permanent magnets and a plurality of electromagnets comprising a first electromagnet, a second electromagnet and a third electromagnet, wherein each of the electromagnets is configured to interact with a respective one of the permanent magnets, and the permanent magnets are rigidly connected to the component after the arranging;

exciting a vibratory response in the component by operating the excitation system to respectively control interaction of the electromagnets with the permanent magnets; and outputting data indicative of the vibratory response from a sensor system.

16. The method of claim 15, further comprising processing the data with a computer system to determine at least one of a structural characteristic or a dynamic response characteristic of the component.

17. The method of claim 15, wherein the operating of the excitation system to control the interaction of the electromagnets with the permanent magnets comprises varying strength, frequency of oscillations and phase of a first magnetic field generated by the first electromagnet according to a function.

18. The method of claim 17, wherein the operating of the excitation system to control the interaction of the electromagnets with the permanent magnets further comprises varying strength, frequency of oscillations and phase of a second magnetic field generated by the second electromagnet according to the function; and the varying of the strength, the frequency of oscillations and the phase of the first magnetic field is out of phase with the varying of the strength, the frequency of oscillations and the phase of the second magnetic field.

19. The method of claim 15, further comprising rotating a rotor about an axis, wherein the rotor and the component form a lift off seal system.

\* \* \* \* \*